US009444690B2

(12) United States Patent
Cheng et al.

(10) Patent No.: US 9,444,690 B2
(45) Date of Patent: Sep. 13, 2016

(54) NETWORK SYSTEM, OPERATING METHOD THEREOF, AND SWITCH

(71) Applicant: ACCTON TECHNOLOGY CORPORATION, Hsinchu (TW)

(72) Inventors: Chen-Chang Cheng, Kaohsiung (TW); Chung-Cheng Hsu, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 66 days.

(21) Appl. No.: 14/308,703

(22) Filed: Jun. 18, 2014

(65) Prior Publication Data

US 2015/0207688 A1 Jul. 23, 2015

(30) Foreign Application Priority Data

Jan. 23, 2014 (TW) .............................. 103102497 A

(51) Int. Cl.
*H04L 12/24* (2006.01)
*H04L 12/751* (2013.01)
*H04L 12/42* (2006.01)

(52) U.S. Cl.
CPC .............. *H04L 41/12* (2013.01); *H04L 45/02* (2013.01); *H04L 12/42* (2013.01)

(58) Field of Classification Search
CPC ..................................................... H04L 41/12
See application file for complete search history.

(56) References Cited

U.S. PATENT DOCUMENTS

| 8,208,407 B2* | 6/2012 | Tallet | H04L 12/462 370/235 |
| 2008/0123561 A1* | 5/2008 | Sharma | H04L 12/4625 370/256 |
| 2010/0020726 A1* | 1/2010 | Chu | H04L 12/462 370/256 |
| 2012/0014291 A1* | 1/2012 | Matinotti | H04L 12/437 370/256 |
| 2012/0224510 A1* | 9/2012 | Bulusu | H04L 45/48 370/256 |

FOREIGN PATENT DOCUMENTS

CN 101834770 A 9/2010

\* cited by examiner

*Primary Examiner* — Brian D Nguyen
*Assistant Examiner* — Toan Nguyen
(74) *Attorney, Agent, or Firm* — CKC & Partners Co., Ltd.

(57) ABSTRACT

An operating method of a network system includes setting a plurality of first connection ports from among a plurality of connection ports of a first switch as belonging to a first loop group; receiving, through the first switch, a topology change notification; determining, through the first switch, whether the topology change notification is received via one of the first connection ports; and under a condition that the topology change notification is received via one of the first connection ports, outputting, through the first switch, the topology change notification via the other one/ones of the first connection ports, and not via the connection port/ports which do/does not belong to the first loop group. With such operation, broadcasting the topology change notification can be avoided, so as to increase the efficiency, bandwidth, and stability of the network system.

14 Claims, 3 Drawing Sheets

NETWORK SYSTEM, OPERATING METHOD THEREOF, AND SWITCH

This application claims priority to Taiwan Application Serial Number 103102497, filed Jan. 23, 2014, which is herein incorporated by reference.

BACKGROUND

1. Field of Invention

The present invention relates to an electronic system, an electronic device, and an operating method. More particularly, the present invention relates to a network system, a switch, and an operating method of a network system.

2. Description of Related Art

With advances in information technology, network systems are widely used in our daily lives.

A typical network system includes several switches. The switches are connected to each other through connection ports to transmit network packets. A spanning tree protocol can be applied to the network system to avoid loops occurred among the switches. In using the spanning tree protocol, when the network topology of the network system is changed, topology change notifications (TCNs) will be broadcasted to all of the switches in the network system to update packet transmission paths in the network system.

However, when changing the network topology of the network system, it is not necessary to update the packet transmission paths corresponding to all of the switches in the network system, as this would cause a decrease in efficiency of the network system. Additionally, broadcasting the TCNs results in flooding and network congestion due to the excessive transmission involved, ultimately resulting in a decrease in bandwidth and stability of the network system.

SUMMARY

One aspect of the present disclosure is related to an operating method applied to a network system. In accordance with one embodiment of the present disclosure, the operating method includes setting a plurality of first connection ports from among a plurality of connection ports of a first switch as belonging to a first loop group; receiving a topology change notification through the first switch; determining whether the topology change notification is received via one of the first connection ports through the first switch; and under a condition that the topology change notification is received via one of the first connection ports, outputting, through the first switch, the topology change notification via the other of the first connection ports, and not via any one of the connection ports which do not belong to the first loop group.

In accordance with one embodiment of the present disclosure, the operating method further includes under the condition that the topology change notification is not received via one of the first connection ports, not outputting the topology change notification via any one of the first connection ports.

In accordance with one embodiment of the present disclosure, the operating method further includes clearing media access control addresses in the first switch corresponding to the first connection ports according to the topology change notification, and not clearing media access control addresses corresponding to any one of the connection ports which do not belong to the first loop group.

In accordance with one embodiment of the present disclosure, the operating method further includes setting a plurality of second connection ports from among the connection ports of the first switch as belonging to a second loop group; determining whether the topology change notification is received via one of the second connection ports through the first switch; and under a condition that the topology change notification is received via one of the second connection ports, outputting the topology change notification via the other of the second connection ports through the first switch, and not via any one of the connection ports which do not belong to the second loop group.

Another aspect of the present disclosure is related to a network system. In accordance with one embodiment of the present disclosure, the network system includes a first switch. The first switch includes a plurality of first connection ports, in which the first switch is set as belonging to a first loop group. The first switch is configured to receive a topology change notification, determine whether the topology change notification is received via one of the first connection ports, and under a condition that the topology change notification is received via one of the first connection ports, output the topology change notification only via the other of the first connection ports.

In accordance with one embodiment of the present disclosure, under a condition that the topology change notification is not received via any one of the connection ports which do not belong to the first loop group, the first switch does not output the topology change notification via any one of the first connection ports.

In accordance with one embodiment of the present disclosure, the first switch is further configured to store at least one media access control address corresponding to the first connection ports, and the first switch is further configured to only clear the at least one media access control address corresponding to the first connection ports according to the topology change notification.

In accordance with one embodiment of the present disclosure, the first switch further includes a plurality of second connection ports. The plurality of second connection ports are set as belonging to a second loop group. The first switch is further configured to determine whether the topology change notification is received via one of the second connection ports, and under a condition that the topology change notification is received via one of the second connection ports, output the topology change notification only via the other of the second connection ports.

Another aspect of the present disclosure is related to a switch accordance with one embodiment of the present disclosure, the switch includes a plurality of first connection ports and a processor. The processor is configured to receive a topology change notification, and depending on whether the topology change notification is received via one of the first connection ports, selectively determines whether to output the topology change notification via the other of the first connection ports.

In accordance with one embodiment of the present disclosure, the switch further includes a plurality of second connection ports. The processor is further configured to, depending on whether the topology change notification is received via one of the second connection ports, selectively determine whether to output the topology change notification via the other of the second connection ports.

In accordance with one embodiment of the present disclosure, the switch further includes a memory. The memory is configured to store at least one media access control address corresponding to the first connection ports and at least one media access control address corresponding to the second connection ports. Under a condition that the topology change notification is received via one of the first connection ports, the processor is configured to only clear the at least one media access control address corresponding to the first connection ports, and under a condition that the topology change notification is received via one of the second connection ports, the processor is configured to only clear the at least one media access control address corresponding to the second connection ports.

Through application of one embodiment described above, when changing the topology of the network system, broadcasting the topology change notification to all of the switches can be avoided, such that the efficiency, bandwidth, and stability of the network system can be increased.

DETAILED DESCRIPTION

Figure 1:
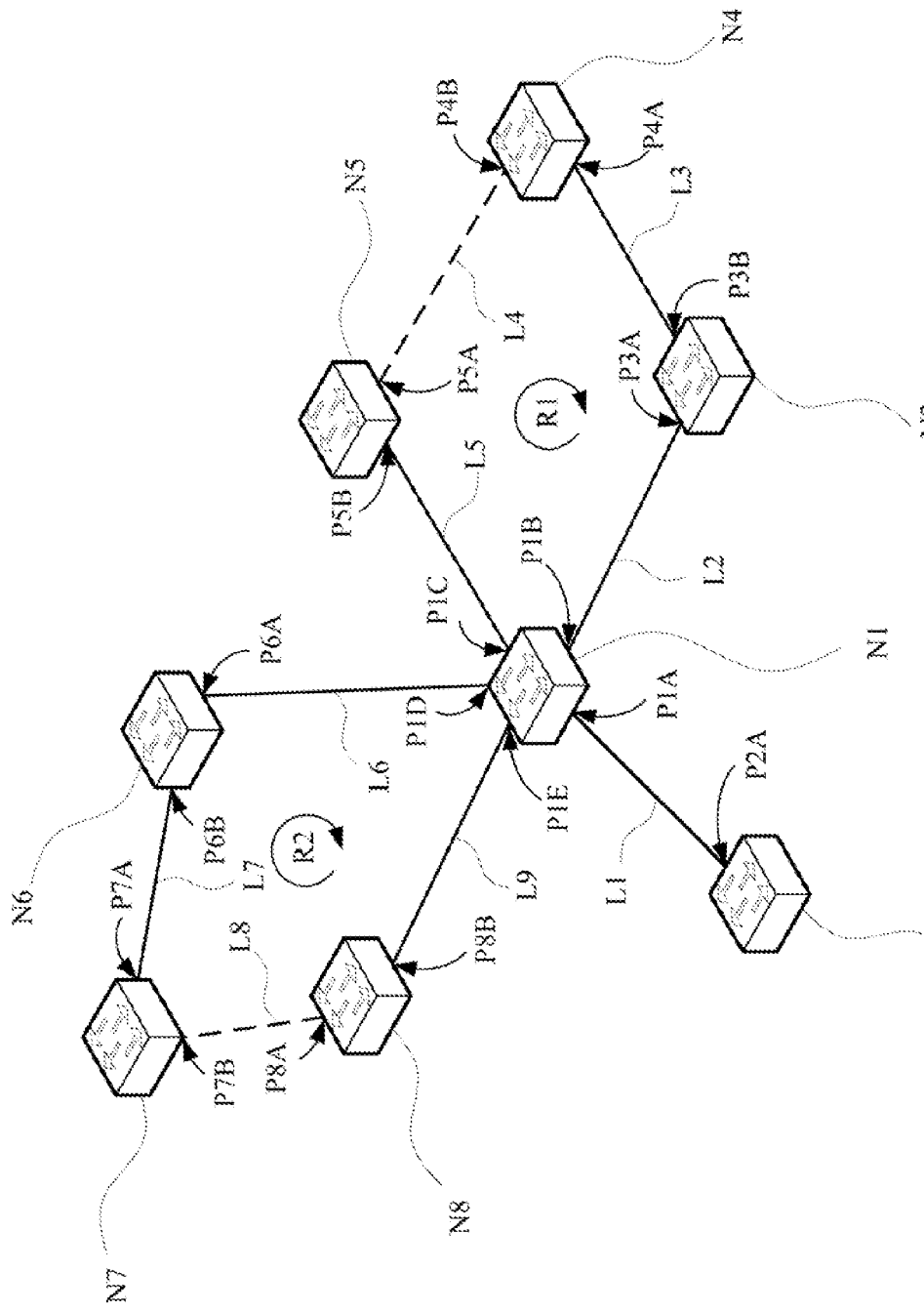
FIG. 1 is a schematic diagram of a network system according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "electrically connected" to another element, it can be directly connected to the other element or intervening elements may be present. In contrast, when an element is referred to as being "directly connected" to another element, there are no intervening elements present. Moreover, "electrically connect" or "connect" can further refer to the interoperation or interaction between two or more elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One aspect of the present disclosure is related to a network system. Through use of the network system, network congestion caused by flooding of topology change notifications of a commonly used spanning tree protocol can be avoided.

To simplify the description below, in the following paragraphs, the structure of the network system will be described with reference to FIG. 1. However, the invention is not limited to the structure of the network system shown in FIG. 1 and described below.

FIG. 1 is a schematic diagram of a network system 100 according to one embodiment of the present invention. In this embodiment, the network system 100 includes switches N1-N8. The switches N1-N8 are electrically connected to each other through connection ports therebetween (e.g., connection ports P1A-P8B), to allow links L1-L9 to be established.

In this embodiment, the switch N1 is electrically connected to the connection port P2A of the switch N2 through the connection port P1A to allow the link L1 to be established between the connection ports P1A, P2A. The switch N1 is electrically connected to the connection port P3A of the switch N3 through the connection port P1B to allow the link L2 to be established between the connection ports P1B, P3A. The switch N3 is electrically connected to the connection port P4A of the switch N4 through the connection port P3B to allow the link L3 to be established between the connection ports P3B, P4A. The switch N4 is electrically connected to the connection port P5A of the switch N5 through the connection port P4B to allow the link L4 to be established between the connection ports P4B, P5A. The switch N5 is electrically connected to the connection port P1C of the switch N1 through the connection port P5A to allow the link L5 to be established between the connection ports P1C, P5A. The switch N1 is electrically connected to the connection port P6A of the switch N6 through the connection port P1D to allow the link L6 to be established between the connection ports P1D, P6A. The switch N6 is electrically connected to the connection port P7A of the switch N7 through the connection port P6B to allow the link L7 to be established between the connection ports P6B, P7A. The switch N7 is electrically connected to the connection port P8A of the switch N8 through the connection port P7B to allow the link L8 to be established between the connection ports P7B, P8A. The switch N8 is electrically connected to the connection port P1E of the switch N1 through the connection port P8B to allow the link L9 to be established between the connection ports P1E, P8B.

It is noted that the number of the switches N1-N8 described above and the connections among the switches N1-N8 are merely for purposes of illustration, and the invention is not limited in this regard. Any number of these devices and connections thereamong that would enable the network system 100 to practice the technical features described below can be used herein.

Figure 2:
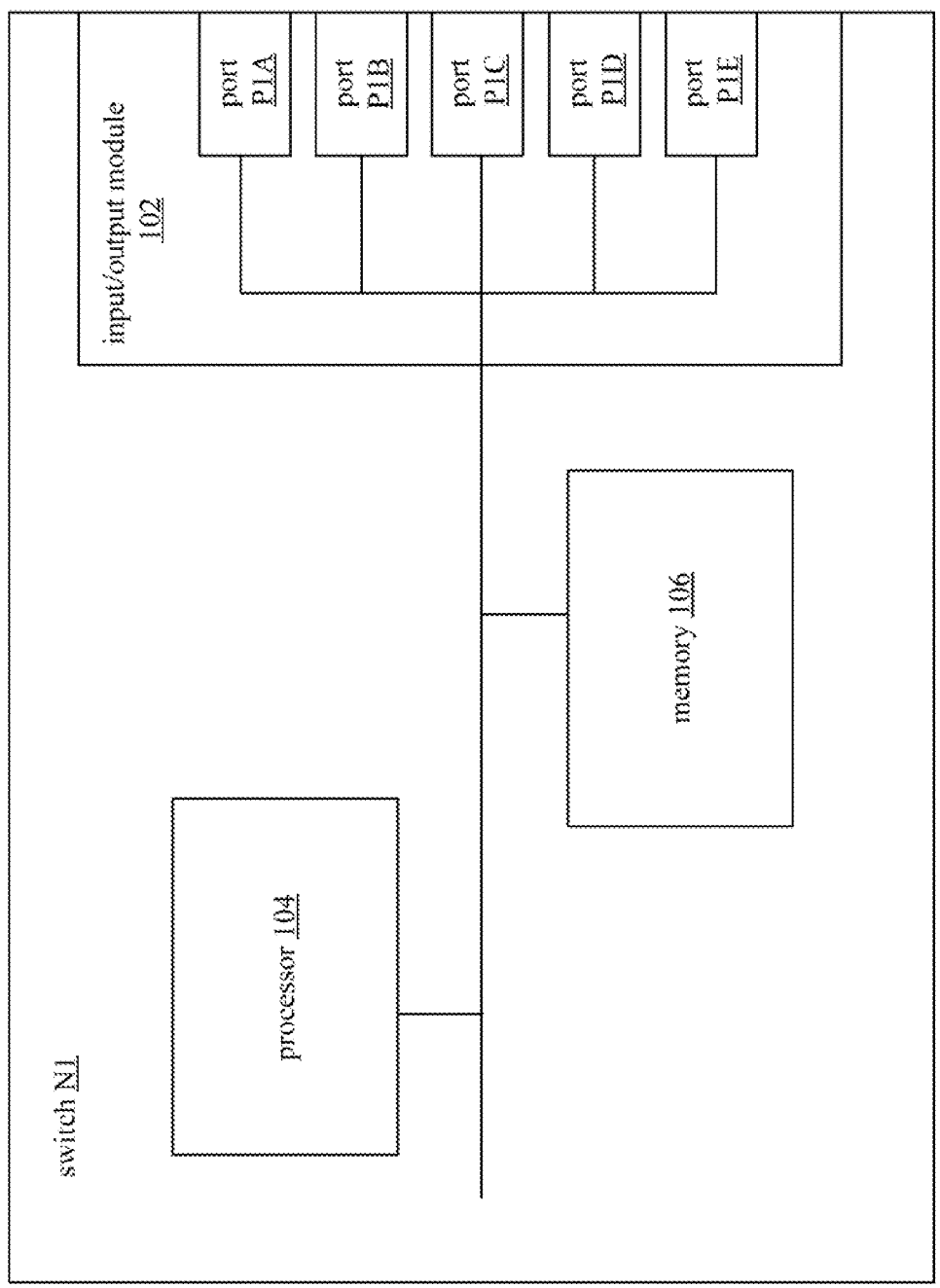
FIG. 2 is a schematic diagram of a switch according to one embodiment of the present invention.

FIG. 2 is a schematic diagram of the switch N1 according to one embodiment of the present invention. The switch N1 includes an input/output module 102, a processor 104, and a memory 106. The input/output module 102 includes the connection ports P1A-P1E. The input/output module 102, the processor 104, and the memory 106 are electrically connected to each other.

In this embodiment, the processor 104 can be realized by, for example, a central processor, a microprocessor, or another appropriate processing device. The memory 106 can be realized by, for example, a flash memory, an EEPROM, or another appropriate non-transient computer readable medium.

In this embodiment, all of the switches N2-N8 have a structure similar to the switch N1. Therefore, a description of structures of the switches N2-N8 will not be provided herein.

In this embodiment, the memory 106 in the switch N1 can be configured to store media access control addresses (MAC addresses) corresponding to the connection ports P1A-P1E, such that the switch N1 can accordingly forward network packets. For example, when a network packet outputted via the connection port P1B can reach a host (not shown), the memory 106 in the switch N1 can record the MAC address of the host. In such a manner, when the switch N1 receives a network packet destined to the host, the switch N1 can immediately forward the network packet via the connection port P1B.

In one embodiment of the present disclosure, the network system 100 can use a protocol similar to the spanning tree protocol to avoid forming loops among the switches N1-N8. For example, in the network system 100, links L4, L8 can be temporarily blocked (e.g., by setting the connection ports P4B, P5A, P7B, P8A to a block state) to avoid forming a loop among the switches N1, N3, N4, N5 (e.g., loop R1) and avoid forming a loop among the switches N1, N6, N7, N8 (e.g., loop R2).

In some approaches, when the network topology of the network system 100 is changed, topology change notifications (TCNs) will be broadcasted to all of the switches N1-N8 in the network system 100, such that the switches that receive the TCNs clear the MAC addresses stored in the memories 106 thereof to update the packet transmission paths in the network system 100.

However, in practice, when changing the network topology of the network system 100, it is not necessary to clear the MAC addresses stored in the memories 106 of all the switches N1-N8 in the network system 100 so as to update the packet transmission paths corresponding thereto.

For example, when the link L3 is broken and the link L4 is recovered from the block state, only the packet transmission paths corresponding to the connection ports which correspond to loop R1 (e.g., the connection ports P1B, P3A, P3B, P4A, P4B, P5A, P5B, P1C) need to be updated. Thus, broadcasting the TCNs and making all of the switches N1-N8 clear the MAC addresses stored in the memory 106 thereof would decrease efficiency of the network system 100. In addition, broadcasting the TCNs may also cause flooding and congestion in the network system 100. As a result, bandwidth and stability of the network system 100 may be decreased.

Thus, in order to increase the efficiency, bandwidth, and stability of the network system 100, in one embodiment described below, at least one loop group can be used to cause the TCN to be transmitted only via specific connection ports.

In one embodiment of the present disclosure, at least a part of the connection ports (e.g., the connection ports P1B, P1C) of one of the switches N1-N8 (e.g., the switch N1) can be set as belonging to a first loop group G1. The switch is configured to receive a TCN through the processor 104 thereof, and determine whether the TCN is received via one of the connection ports thereof which belong to the first loop group G1 (e.g., one of the connection ports P1B, P1C). Under a condition that the TCN is received via one of the connection ports which belong to the first loop group G1, the switch is configured to output the TCN through the processor 104 thereof via the other of the connection ports thereof which belong to the first loop group G1 (e.g., the other one of the connection ports P1B, P1C), and not via any one of the connection ports thereof which do not belong to the first loop group G1 (e.g., the connection ports P1A, P1D, P1E), so as to avoid the TCN being transmitted to an irrelevant switch in the network system 100.

In addition, in one embodiment, under the condition that the TCN is received via one of the connection ports which belong to the first loop group G1, the switch is configured to clear the MAC addresses stored in the memory 106 thereof corresponding to the connection ports which belong to the first loop group G1 (e.g., the connection ports P1B, P1C) through the processor 104 thereof, and not clear the MAC addresses corresponding to any one of the connection ports thereof which do not belong to the loop group G1 (e.g., any one of the connection ports P1A, P1D, P1E), so as to avoid updating packet transmission paths corresponding to the connection ports which do not belong to the first loop group G1.

In addition, under a condition that the TCN is not received via any one of the connection ports which belong to the first loop group G1 (e.g., any one of the connection ports P1B, P1C), the switch refrains from outputting the TCN via any one of the connections ports thereof which belong to the first loop group G1, and refrains from clearing any one of the MAC addresses stored in the memory 106 thereof.

For example, in one operative embodiment, the connection ports P1B, P3A, P3B, P4A, P4B, P5A, P5B, P1C corresponding to loop R1 are set as belonging to the first loop group G1. When the switch N1 receives the TCN via the connection port P1C, the switch N1 outputs the TCN to the connection port P3A of the switch N3 via the connection port P1B, and not via the connection ports P1A, P1D, P1E which do not belong to the first loop group G1.

In such a manner, the TCN will only be transmitted to the switches corresponding to loop R1 (e.g., the switches N1, N3, N4, and N5), such that broadcasting the TCN to other irrelevant switches (e.g., the switches N6, N7, N8, N2) in the network system 100 can be avoided.

In addition, in this operative embodiment, when the switch N1 receives the TCN via the connection port P1C, the switch N1 only clears the MAC addresses corresponding to the connection ports P1B, P1C stored in the memory 106 thereof. For example, the switch N1 only clears the MAC addresses of the hosts which can be reached via the connection ports P1B, P1C.

In such a manner, the network system 100 can only update the packet transmission paths corresponding to the connection ports corresponding to loop R1 (e.g., the connection ports P1B, P3A, P3B, P4A, P4B, P5A, P5B, P1C), such that updating the packet transmission paths corresponding to irrelevant connection ports (e.g., connection ports P1A, P1D, P1E, P6A, P6A, P7A, P7B, P8A, P8B) can be avoided.

In addition, in this operative embodiment, when the switch N1 receives the TCN via the connection port P1D, the switch N1 refrains from outputting the TCN via any one of the connection ports P1B, P1C and refrains from clearing any one of the MAC addresses corresponding to the connection ports P1B, P1C stored in the memory 106 thereof.

In such a manner, after the switches corresponding to loop R1 (e.g., the switches N1, N3, N4, N5) receive the TCN transmitted by the switches not corresponding to loop R1 (e.g., the switches N6, N7, N8, N2), these switches (e.g., the switches N1, N3, N4, N5) can avoid updating the packet transmission paths corresponding to the connection ports of themselves.

Thus, through use of one embodiment described above, when changing the topology of the network system 100, broadcasting the TCNs to all of the switches N1-N8 can be avoided. As a result, the efficiency, bandwidth, and stability of the network system can be increased.

In one embodiment of the present disclosure, the connection ports in the loop group R1 are set in advance by an administrator. However, the invention is not limited to such an embodiment.

In one embodiment of the present disclosure, after any one of the switches N1-N8 clears the MAC addresses stored in the memory 106 thereof, this switch obtains a new MAC address again through, for example, an address resolution protocol (ARP). However, the invention is not limited to this embodiment.

In one embodiment of the present disclosure, one of the switches N1-N8 can utilize, for example, an Ethernet protecting switching ring (EPSR) protocol to determine whether the network topology of the network system 100 is changed by exchanging health messages, and accordingly outputs the TCNs.

In one embodiment of the present disclosure, the TCNs can be transmitted through, for example, bridge protocol data unit (BPDU) packets or spanning tree TCN packets.

In addition, in one embodiment of the present disclosure, different connection ports of a same switch can be separately set as belonging to different loop groups.

That is, at least a portion of the connection ports (e.g., the connection ports P1B, P1C) of one of the switches N1-N8 (e.g., the switch N1) can be set as belonging to the first loop group G1, and at least another portion of the connection ports (e.g., the connection ports P1D, P1E) of this switch can be set as belonging to the second loop group G2 (e.g., the second loop group G2 includes the connection ports P1D, P1E, P6A, P6B, P7A, P7B, P8A, P8B corresponding to loop R2). This switch is configured to receive a TCN through the processor 104 thereof, and determine whether the TCN is received via one of the connection ports which belong to the first loop group G1 (e.g. one of the connection ports P1B, P1E), or via one of the connection ports which belong to the second loop group G2 (e.g., one of the connection ports P1D, P1E).

Under a condition that the TON is received via one of the connection ports which belong to the first loop group G1 (e.g. one of the connection ports P1B and P1C), this switch is configured to output the TCN only via the other of the connection ports thereof which belong to the first loop group G1 (e.g., another one of the connection ports P1B, P1C) through the processor 104 thereof.

In addition, under the condition that the TCN is received via one of the connection ports which belong to the first loop group G1 (e.g., one of the connection ports P1B, P1C), this switch is configured to only clear the MAC address corresponding to the connection ports which belong to the first loop group G1 (e.g., the connection ports P1B, P1C).

Under a condition that the TCN is received via one of the connection ports which belong to the second loop group G2 (e.g., one of the connection ports P1D, P1E), this switch is configured to output the TCN only via the other connection ports thereof which belong to the second loop group G2 (e.g., only via another one of the connection ports P1D, P1E) through the processor 104 thereof, so as to avoid the TCN being transmitted to an irrelevant switch in the network system 100.

In addition, under the condition that the TCN is received via one of the connection ports which belong to the second loop group G2 (e.g., one of the connection ports P1D, P1E), this switch only clears the MAC addresses corresponding to the connection ports which belong to the second loop group G2 (e.g., the connection ports P1D, P1E) through the processor 104 thereof.

Furthermore, under a condition that the TCN is not received via any one of the connection ports which belong to the first and the second loop groups G1, G2 (e.g., received via the connection port P1A), this switch is configured to refrain from outputting the TCN via any one of the connection ports which belong to the first and the second loop groups G1, G2 through the processor 104 thereof.

Additionally, under the condition that the TCN is not received via any one of the connection ports which belong to the first and the second loop groups G1, G2, this switch refrains from clearing any one of the MAC addresses corresponding the connection ports thereof which belong to the first and the second loop groups G1,G2.

It is noted that other details of this embodiment can be ascertained by referring to the previous embodiment, and a description in this regard will not be repeated herein.

Another aspect of the present disclosure is related to an operating method. The operating method can be implemented by a network system with the same or similar structure of the network system 100 shown in FIG. 1. To simplify the description below, in the following paragraphs, the network system 100 shown in FIG. 1 will be taken as an example to describe the operating method according to an embodiment of the present disclosure. However, the present disclosure is not limited in this regard.

In addition, it should be noted that, in the steps of the following operating method, no particular sequence is required unless otherwise specified. Moreover, the following steps also may be performed simultaneously or the execution times thereof may at least partially overlap.

Figure 3:
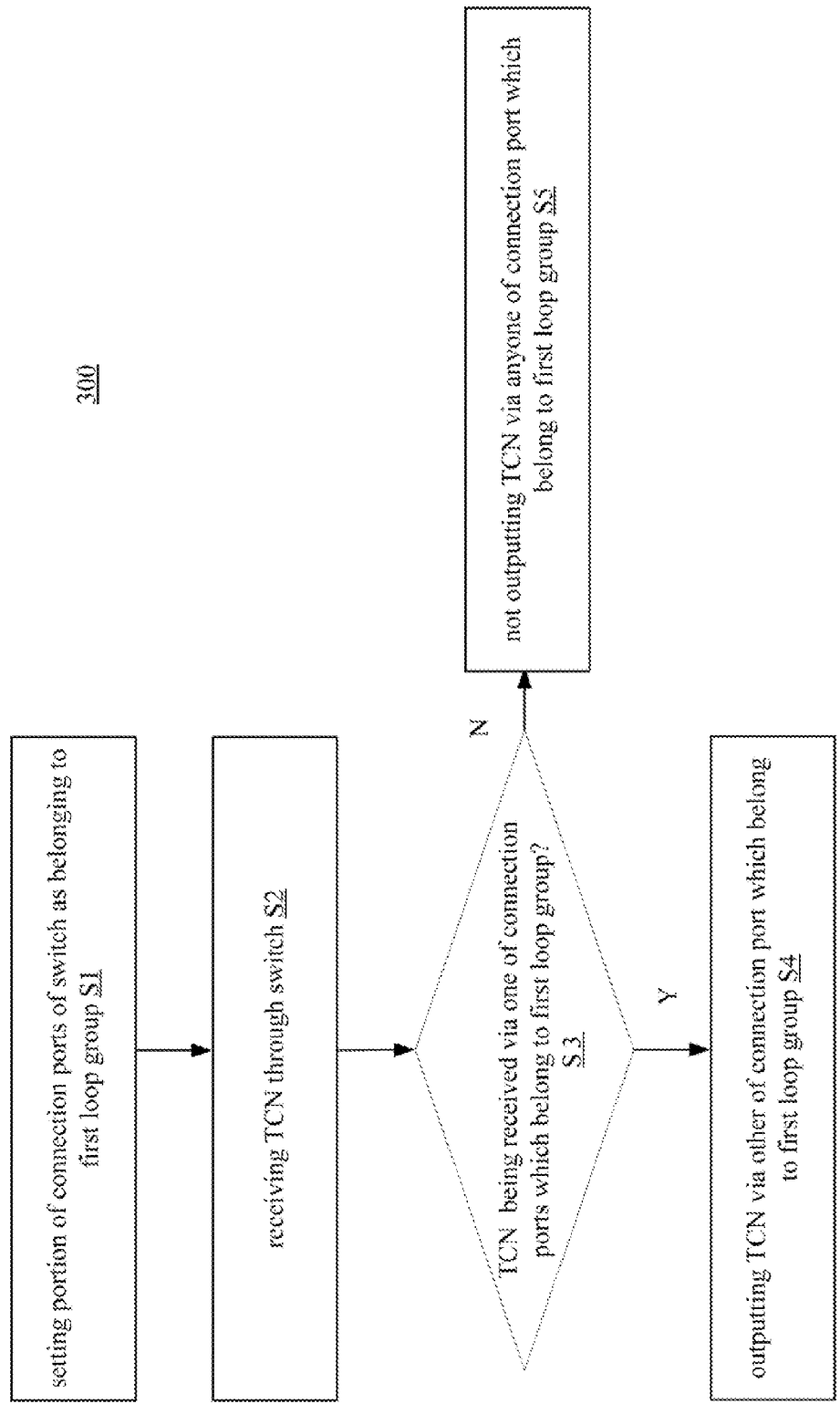
FIG. 3 is a flowchart of an operating method according to one embodiment of the present invention.

FIG. 3 is a flowchart of an operating method 300 according to one embodiment of the present invention. The operating method 300 includes a number of steps as outlined below.

In step S1, a part of the connection ports (e.g., the connection ports P1B, P1C) of the switch N1 in the network system 100 are set as belonging to a first loop group G1. In one embodiment of the present disclosure, the connection ports in the first loop group G1 are set in advance by an administrator. However, the present disclosure is not limited in this regard.

In step S2, the switch N1 receives the TCN.

In step S3, the switch N1 determines whether the TCN is received via one of the connection ports which belong to the first loop group G1 (e.g., one of the connection ports P1B, P1C). If the TCN is received via one of the connection ports which belong to the first loop group G1, step S4 is performed; if not, step S5 is performed.

In step S4, under a condition that the TCN is received via one of the connection ports which belong to the first loop group G1 (e.g., one of the connection ports P1B, P1C), the switch N1 outputs the TCN via the other of the connection ports thereof which belong to the first loop group G1 (e.g., the other of the connection ports P1B, P1C), and not via any one of the connection ports thereof which do not belong to the first loop group G1 (e.g., any one of the connection ports P1A, P1D, P1E).

In step S5, under a condition the TCN is not received via any one of the connection ports which belong to the loop group G1 (e.g., any one of the connection ports P1B, P1C), the switch N1 refrains from outputting the TCN via any one of the connection ports thereof which belong to the first loop group G1 (e.g., any one of the connection ports P1B, P1C).

Through such an operation, the TCN will only be transmitted to the switches corresponding to loop R1 (e.g., the switches N1, N3, N4, N5), such that the TCN being broadcasted to irrelevant switches (e.g., the switches N6, N7, N8, N2) in the network system 100 can be avoided.

It is noted that details of steps S1-S5 described above can be ascertained by referring to the previous embodiment, and a description in this regard will not be repeated herein.

In accordance with one embodiment of the present disclosure, an operating method applied to the network system is disclosed herein. The operating method includes setting a plurality of first connection ports from among a plurality of connection ports of a first switch as belonging to a first loop group; receiving a topology change notification through the first switch; determining whether the topology change notification is received via one of the first connection ports through the first switch; and under a condition that the topology change notification is received via one of the first connection ports, outputting, through the first switch, the topology change notification via the other of the first connection ports, and not via any one of the connection ports which do not belong to the first loop group.

In accordance with another embodiment of the present disclosure, a network system is disclosed herein. The network system includes a first switch. The first switch includes a plurality of first connection ports, in which the first switch is set as belonging to a first loop group. The first switch is configured to receive a topology change notification, determine whether the topology change notification is received via one of the first connection ports, and under a condition that the topology change notification is received via one of the first connection ports, output the topology change notification only via the other of the first connection ports.

In accordance with another embodiment of the present disclosure, a switch is disclosed herein. The switch includes a plurality of first connection ports and a processor. The processor is configured to receive a topology change notification, and depending on whether the topology change notification is received via one of the first connection ports, selectively determines whether to output the topology change notification via the other of the first connection ports.

Although the present invention has been described in considerable detail with reference to certain embodiments thereof, other embodiments are possible. Therefore, the scope of the appended claims should not be limited to the description of the embodiments contained herein.

What is claimed is:

1. An operating method applied to a network system, the operating method comprising:
setting a plurality of first connection ports from among a plurality of connection ports of a first switch as belonging to a first loop group;
receiving, through the first switch, a topology change notification;
determining, through the first switch, whether the topology change notification is received via one of the first connection ports; and
under a condition that the topology change notification is received via one of the first connection ports, outputting, through the first switch, the topology change notification via the other of the first connection ports, and not via any one of the connection ports which do not belong to the first loop group; and
clearing a first media access control address corresponding to the one of the first connection ports receiving the topology change notification and a second media access control address corresponding to the other of the first connection ports outputting the topology change notification according to the topology change notification, and not clearing any third media access control address corresponding to any one of the connection ports which do not belong to the first loop group.

2. The operating method as claimed in claim 1, further comprising:
setting a plurality of second connection ports from among the connection ports of the first switch as belonging to a second loop group;
determining, through the first switch, whether the topology change notification is received via one of the second connection ports; and
under a condition that the topology change notification is received via one of the second connection ports, outputting, through the first switch, the topology change notification via the other of the second connection ports, and not via any one of the connection ports which do not belong to the second loop group.

3. The operating method as claimed in claim 1, further comprising:
under the condition that the topology change notification is not received via one of the first connection ports, refraining from outputting the topology change notification via any one of the first connection ports.

4. The operating method as claimed in claim 3, further comprising:
setting a plurality of second connection ports from among the connection ports of the first switch as belonging to a second loop group;
determining, through the first switch, whether the topology change notification is received via one of the second connection ports; and
under a condition that the topology change notification is received via one of the second connection ports, outputting, through the first switch, the topology change notification via the other of the second connection ports, and not via any one of the connection ports which do not belong to the second loop group.

5. The operating method as claimed in claim 1, further comprising:
setting a plurality of second connection ports from among the connection ports of the first switch as belonging to a second loop group;
determining, through the first switch, whether the topology change notification is received via one of the second connection ports; and
under a condition that the topology change notification is received via one of the second connection ports, outputting, through the first switch, the topology change notification via the other of the second connection ports, and not via any one of the connection ports which do not belong to the second loop group.

6. A network system comprising:
a first switch comprising a plurality of first connection ports set as belonging to a first loop group, wherein the first switch is configured to receive a topology change notification, determine whether the topology change notification is received via one of the first connection ports, under a condition that the topology change notification is received via one of the first connection ports, output the topology change notification only via the other of the first connection ports, and clear a first media access control address corresponding to the one of the first connection ports receiving the topology change notification and a second media access control address corresponding to the other of the first connection ports outputting the topology change notification according to the topology change notification, and not clear any third media access control address corresponding to any one of the connection ports which do not belong to the first loop group.

7. The network system as claimed in claim 6, wherein the first switch further comprises:
a plurality of second connection ports set as belonging to a second loop group, wherein the first switch is further configured to determine whether the topology change notification is received via one of the second connection ports, and under a condition that the topology change notification is received via one of the second connection ports, output the topology change notification only via the other of the second connection ports.

8. The network system as claimed in claim 6, wherein under the condition that the topology change notification is not received via one of the first connection ports, the first switch refrains from outputting the topology change notification via any one of the first connection ports.

9. The network system as claimed in claim 8, wherein the first switch further comprises:
a plurality of second connection ports set as belonging to a second loop group;
wherein the first switch is further configured to determine whether the topology change notification is received via one of the second connection ports, and output the topology change notification only via the other of the second connection ports under a condition that the topology change notification is received via one of the second connection ports.

10. The network system as claimed in claim 6, wherein the first switch is further configured to store at least one media access control address corresponding to the first connection ports, and the first switch is further configured to only clear the at least one media access control address corresponding to the first connection ports according to the topology change notification.

11. The network system as claimed in claim 10, wherein the first switch further comprises:
a plurality of second connection ports set as belonging to a second loop group, wherein the first switch is further configured to determine whether the topology change notification is received via one of the second connection ports, and under a condition that the topology change notification is received via one of the second connection ports, output the topology change notification only via the other of the second connection ports.

12. A switch comprising;
a plurality of first connection ports; and
a processor configured to receive a topology change notification, depending on whether the topology change notification is received via one of the first connection ports, selectively determines whether to output the topology change notification via the other of the first connection ports, clear a first media access control address corresponding to the one of the first connection ports receiving the topology change notification and a second media access control address corresponding to the other of the first connection ports outputting the topology change notification according to the topology change notification, and not clear any third media access control address corresponding to any one of the connection ports which do not belong to the first loop group.

13. The switch as claimed in claim 12 further comprising:
a plurality of second connection ports, wherein the processor is further configured to, depending on whether the topology change notification is received via one of the second connection ports, selectively determine whether to output the topology change notification via the other of the second connection ports.

14. The switch as claimed in claim 13 further comprising:
a memory configured to store at least one media access control address corresponding to the first connection ports and at least one media access control address corresponding to the second connection ports, wherein under a condition that the topology change notification is received via one of the first connection ports, the processor is configured to only clear the at least one media access control address corresponding to the first connection ports, and under a condition that the topology change notification is received via one of the second connection ports, the processor is configured to only clear the at least one media access control address corresponding to the second connection ports.

* * * * *